June 3, 1941.  C. SAURER  2,244,633
RESILIENT WHEEL
Filed Dec. 4, 1937  2 Sheets-Sheet 1
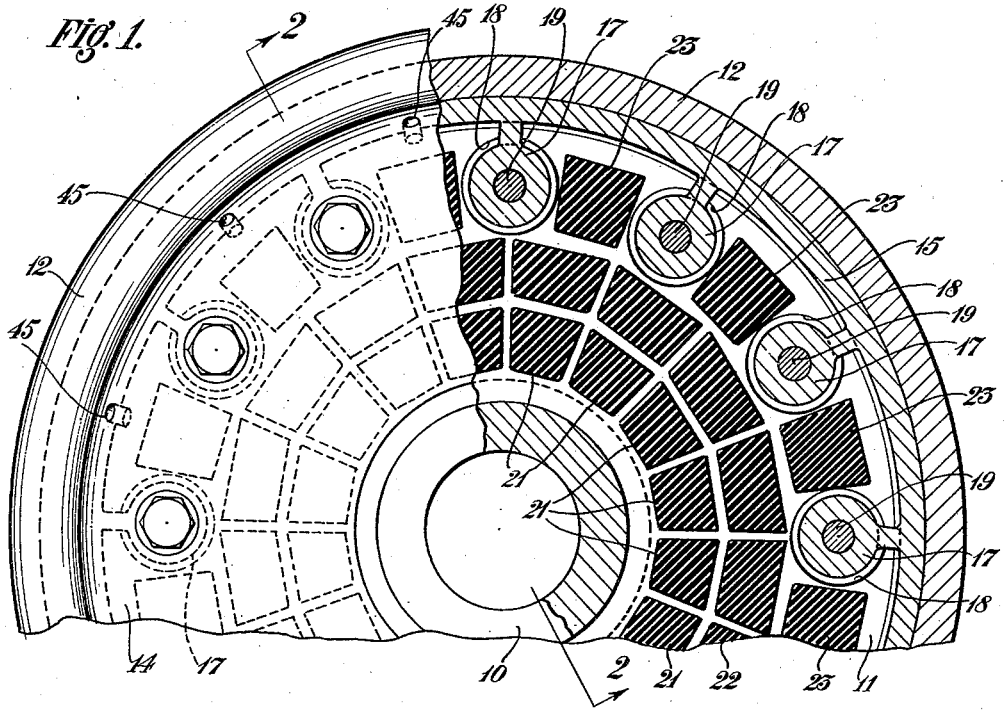
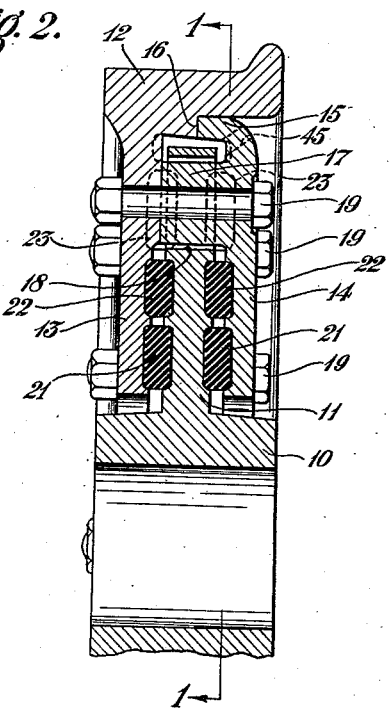
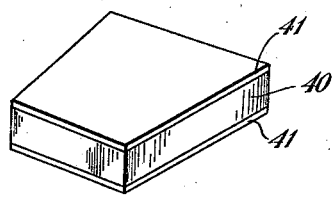
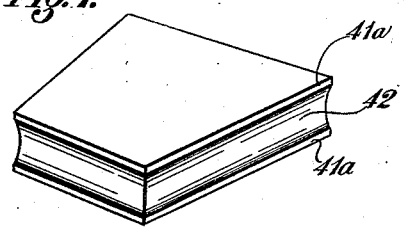
INVENTOR
Curt Saurer
BY Albert L. Ely
ATTORNEY June 3, 1941.  C. SAURER  2,244,633
RESILIENT WHEEL
Filed Dec. 4, 1937  2 Sheets-Sheet 2
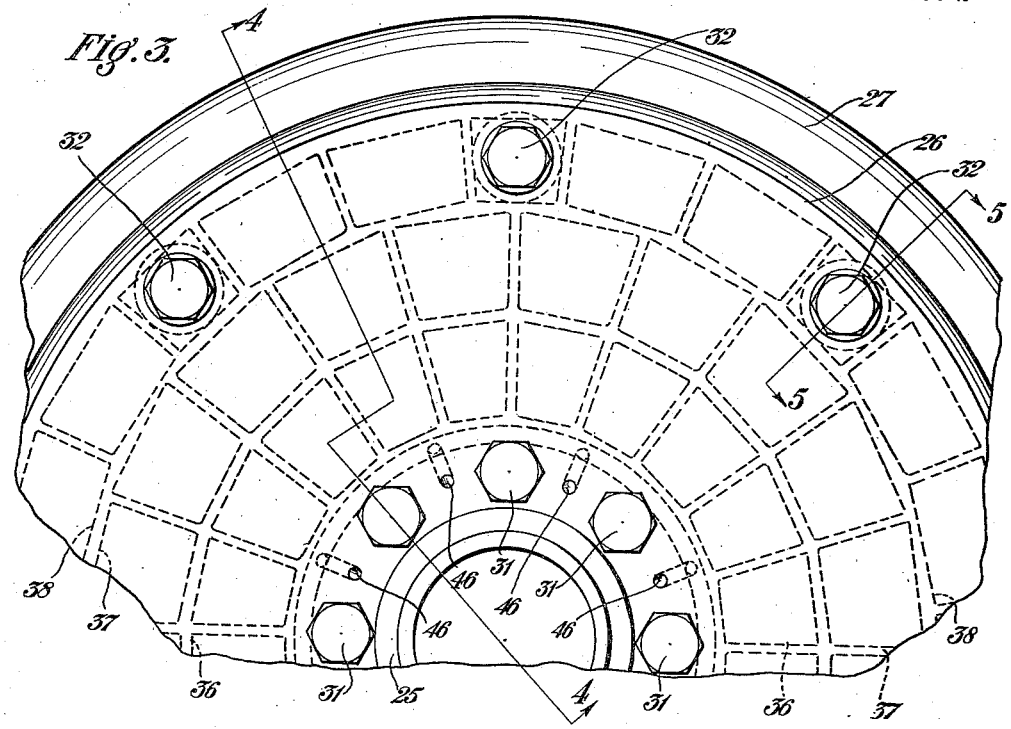
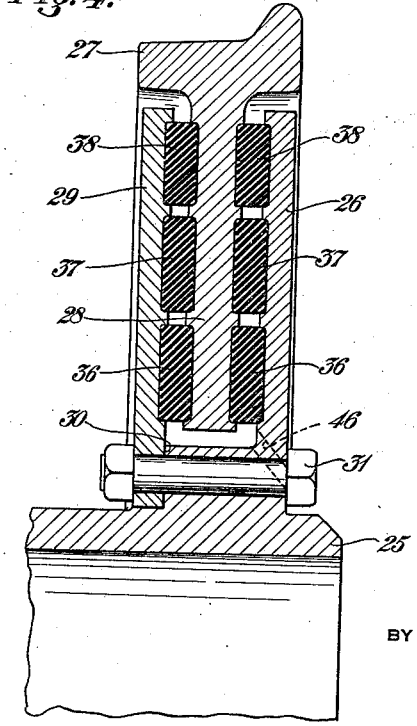
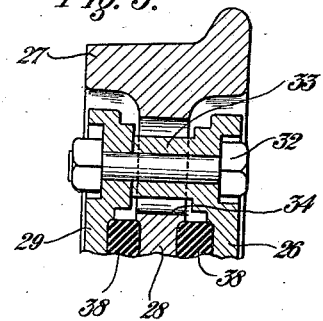
INVENTOR
Curt Saurer
BY
Albert L. Ely
ATTORNEY Patented June 3, 1941

2,244,633

UNITED STATES PATENT OFFICE 2,244,633

RESILIENT WHEEL

Curt Saurer, Akron, Ohio, assignor to The Firestone Tire & Rubber Company, Akron, Ohio, a corporation of Ohio Application December 4, 1937, Serial No. 178,085

9 Claims. (Cl. 295—11)

This invention relates to resilient wheels for vehicles, and more especially it relates to resilient wheels for rail vehicles such as street cars and railway cars.

The invention is especially applicable in the situations mentioned for the reason that it promotes the comfort of the passengers, and furthermore it reduces the destructive vibration that is present in all rail vehicles that travel at high speed.

The chief objects of the invention are to provide for the safety and comfort of the passengers of rail vehicles; to provide a resilient wheel wherein the resilient elements are not subject to excessive strain or deformation; to provide a resilient wheel with resilient elements that will not generate internal heat sufficient to cause them to blow up or chafe; to provide for the effective cooling of the resilient elements; to provide a construction of the character mentioned wherein vibration is resisted and suppressed primarily by the resistance to deformation of the resilient elements; to provide a resilient wheel wherein the resilient elements are so arranged as to provide larger deflection of the parts and hence greater resiliency than heretofore has been possible; and to effect greater absorption of noise without the sacrifice of stability. A more specific object is to provide a wheel of the character mentioned wherein the relatively movable metal elements are arranged to come into contact with each other after determinate deformation of the resilient elements, to prevent excessive deformation of the latter; and to provide against complete collapse of the wheel upon failure of the resilient elements. A further object is to provide a wheel of the character mentioned wherein the tire may be changed or replaced without removal of the wheel-hub from the axle on which it is mounted. Other objects will be manifest as the specification proceeds.

Of the accompanying drawings:

Figure 1 is a fragmentary side elevation of a vehicle wheel embodying the invention, in its preferred form, a part thereof being in section on the line 1—1 of Figure 2;

Figure 2 is a section on the line 2—2 of Figure 1;

Figure 3 is a fragmentary side elevation of another embodiment of the invention;

Figure 4 is a section on the line 4—4 of Figure 3;

Figure 5 is a section on the line 5—5 of Figure 3;

Figure 6 is a perspective view of a modified type of resilient element; and

Figure 7 is a perspective view of another modified resilient element.

Referring to Figures 1 and 2 of the drawings, 10 is the hub of a rail wheel, 11 is a relatively wide circumferential flange extending radially outwardly therefrom midway between the ends thereof, 12 is the metal tire of the wheel, and 13 is a circumferential flange extending radially inwardly from the inner periphery thereof, and from adjacent one of the lateral faces of the tire. In the assembled structure the said hub flange 11 and the tire flange 13 are disposed in parallel planes but axially spaced apart from each other, the said tire flange encircling the hub but having substantial clearance thereabout and the tire 12 encircling the hub flange 11 in spaced relation thereto. Secured to the tire flange 13 is an annular cap plate 14 that is disposed parallel to the hub flange 11 and said tire flange, the outer peripheral portion of said cap plate being formed with an axially extending flange 15 that abuts a shoulder or seat 16 formed on the inner periphery of the tire 12. The inner periphery of the cap plate 14 encircles the hub 10 but has substantial clearance thereabout. The arrangement is such that the hub flange 11 is positioned between the tire flange 13 and cap plate 14 in laterally spaced relation to both of them. The inner lateral face of the cap plate 14 is formed, near its outer periphery, with a series of bosses 17, 17 that extend through respective apertures 18, formed in the hub flange 11, and abut the inner lateral face of the tire flange 13. The cap plate is secured to the latter by means of bolts 19, 19 that extend through the bosses 17 at the respective axes thereof. The apertures 18 normally are concentric with the axes of the respective bosses, and are of such size as to have a fraction of an inch clearance about the perimeter of the bosses, the arrangement being such as to permit limited movement of the hub structure relatively of the tire structure both radially and angularly, as presently will be explained.

Positioned upon each side of the hub flange 11, between the latter and the tire flange 13 and cap plate 14 respectively, are a plurality of series of resilient blocks or elements, herein shown as three in number although a greater or lesser number may be provided if desired. The elements of the inner series being designated 21, 21, the elements of the intermediate series being designated 22, 22, and the elements of the outer series being designated 23, 23. The elements or blocks 21, 22 are trapezoidal in contour, the blocks 22 being somewhat larger than the blocks 21 and being disposed in radial alignment with the latter. There are a greater number of blocks 21, 22 in the respective series than there are bolts 19, with the result that the blocks are asymmetrically disposed with relation to the latter. The blocks 23 are trapezoidal in shape, and are disposed between adjacent bolts 19, thus being asymmetrically disposed with relation to the blocks 21, 22, and fewer in number than the latter. The trapezoidal shape of the resilient blocks conserves space and makes possible the use of the greatest number of blocks. Short cylindrical blocks may be employed in some situations, as in wheels for supporting lighter loads, but the trapezoidal blocks are preferred for the reason that they present greater shearing area than cylindrical blocks, and provide the maximum area of exposed rubber to the end that superior heat radiation is obtainable. For retaining the blocks 21, 22 and 23 properly in position, the opposite lateral faces of the hub flange 11 and the adjacent faces of the tire flange 13 and cap plate 14 are formed with shallow recesses that are of the same contour as the respective blocks, and in which minor portions of the latter are received. The blocks 21, 22 and 23 preferably are composed of vulcanized rubber, and are of such thickness that they are placed under substantial compressive stress when the cap plate 14 is forced into the position illustrated by the setting up of the bolts 19. Because of the compression of the elements 21, 21, and 23 in the direction of the axis of the wheel, they strongly resist relative axial movement between the hub 10 and the tire 12, thereby preventing side sway of the vehicle.

It will be seen that the hub structure is floating, normally being supported by the tire structure entirely through the agency of the rubber elements. The arrangement is such that relative movement of the hub structure radially of the tire structure yieldingly is opposed by all of the resilient elements by reason of their resistance to shear and deformation. Before relative radial movement between the hub structure and tire structure becomes great enough to impose destructive strain upon the resilient elements, the margins of all of the apertures 18 of the hub flange 11 will come into contact with the respective bosses disposed in said apertures, with the result that further relative radial movement of the hub and tire structures is prevented.

Upon occasion, as when brakes are applied to the tire 12, or when the hub 10 is fixed upon a power-driven axle, there may be relative angular movement between the hub structure and the tire structure, and such movement yieldingly is resisted by the resilient elements 21, 22 and 23, by reason of their resistance to shear and deformation. The said resilient elements are so shaped and arranged that they resist both radial and angular relative movements of the hub structures with equal facility, in either case all of the resilient elements being subjected to stress. Excessive relative angular movement between the hub structure and tire structure is prevented by the bosses 17 in the same manner that excessive radial movement between said members is prevented, the amplitude of relative movement being limited to the clearance between the bosses and the margins of apertures 18.

Stresses imposed upon the resilient elements by relative movement between the hub structure and tire structure generate heat interiorly of the said elements, but because of the relatively small size of the latter, and because they have a substantial exposed area, such internal heat is dissipated by radiation and never reaches the point where it is destructive to the elements. In this respect the wheel is a distinct improvement over prior art wheels employing a single, relatively large resilient element.

Radiation of generated heat from the resilient blocks is facilitated by the passage of air thereon, and to this end means is provided for effecting the passage of air through the wheel while it is in motion. Such means consists of the provision of a circumferential series of apertures 45, 45 extending through the cap plate 14 near the outer periphery thereof and communicating with the space within the wheel. Thus when the wheel rotates, centrifugal force set up by said rotation will cause air to be drawn into the wheel structure, through the space between the hub 10 and the inner peripheries of the cap plate 14 and tire flange 13, and to be ejected through the apertures. The air is thus forced to flow over the exposed portions of the resilient blocks with resultant cooling of the latter.

The invention is relatively simple in construction, the resilient elements readily may be replaced if necessary, the invention contributes to the comfort and safety of passenger travel, and achieves the other objects set out in the foregoing statement of objects.

In the embodiment of the invention shown in Figures 3 to 5 there is provided a wheel hub 25 that is formed with a relatively wide circumferential flange 26 adjacent one end thereof, and a metal tire 27 that is formed with a circumferential flange 28 extending inwardly from the inner periphery thereof in the medial plane of the tire. In the assembled structure the hub flange 26 and the tire flange 28 are disposed in parallel planes, but axially spaced apart from each other, said tire flange encircling the hub 25 and having its inner periphery spaced a fraction of an inch from the perimeter of the latter. Secured to the hub flange 26 and hub 25 is an annular cap plate 29 that has its inner periphery seated upon said hub against a shoulder 30 thereon. The cap plate 29 is disposed on the opposite side of the tire flange 28 from the hub flange 26, parallel to the latter in spaced relation to said tire flange, the outer periphery of the hub flange and cap plate being spaced from the inner periphery of the tire 27 a distance that is slightly greater than the radial distance between hub 25 and the inner periphery of tire flange 28. The cap plate 29 is secured to the hub structure by two circumferential series of bolts 31, 31 and 32, 32, of which bolts 29 extend through the hub and through the cap plate adjacent the inner periphery of the latter. The bolts 32 extend through the hub flange 26 and cap plate 29 adjacent the outer periphery of those members. Concentric with the axis of each bolt 32 is an annular boss 33 that is formed on the inner face of the hub flange 26, and which extends through an aperture 34 formed in tire flange 28, the outer end of said boss abutting the inner face of cap plate 29. The apertures 34 normally are concentric with the axes of the respective bosses 33, and have a clearance of a fraction of an inch about said bosses, which clearance is the same as the clearance between hub 25 and the inner periphery of tire flange 28.

Positioned upon each side of the tire flange 28, between the latter and the hub flange 26 and cap plate 29 respectively, are three concentric series of resilient blocks or elements 36, 36, 37, 37, and 38, 38, the construction, arrangement, and function of said resilient elements being the same as in the previously described embodiment of the invention.

It will be seen that the hub structure is supported by the tire structure entirely through the agency of the resilient rubber elements, whereby relative radial angular or axial movement of the said structures is yieldingly opposed. Before relative radial movement between the hub structure and tire structure becomes great enough to impose destructive strain upon the resilient elements the inner periphery of tire flange 28 will come into contact with the outer periphery of hub 25, and the margins of apertures 34 will come into contact with bosses 33 and thus prevent further radial movement between the hub and tire structures. The bosses 33 also limit relative angular movement between the hub and tire structures to a determinate safe minimum. Since the resilient elements are under compressive strain in the direction of the axis of the wheel, relative axial movement between the hub and tire structures is opposed by the resistance of the resilient elements to further deformation.

To effect the circulation of air within the wheel structure, in the manner and for the purpose set forth with relation to the previously described embodiment, the hub flange 26 is formed with a circumferential series of apertures 46, 46 that extend to the space within the wheel, adjacent the juncture of said flange with hub 25. Air drawn into the wheel through apertures 46 passes about the resilient blocks and is ejected from the wheel through the space between the inner periphery of tire 27 and the outer peripheries of hub flange 26 and cap plate 27.

The modified resilient element shown in Figure 6 comprises a rubber block 40 to which metal plates 41, 41 are secured on opposite sides thereof, as by being vulcanized thereto. Said metal plates are coextensive with the faces of the block that are received in the shallow recesses formed in the opposed lateral faces of the hub flange, tire flange, and cap plate of the wheel structure. The use of the metal plates 41 assures that the resilient elements will not be pulled from the said recesses by relative radial or angular movement of the hub and tire members. For this reason the bolts 19 of the first described embodiment, or the bolts 31, 32 of the last described embodiment, do not need to be set up as tightly as is required when the resilient elements do not have metal facings, with the result that a softer ride is obtained, which is desirable under some circumstances, for example, with light loads.

The modified resilient element shown in Figure 7 is similar to that shown in Figure 6 in that it includes the metal facing plates 41a, 41a, and differs only in the marginal portions of the rubber member 42, which are longitudinally recessed or grooved as shown. The construction is such that when the resilient elements are placed under compression, in a wheel structure, the marginal portions of the elements do not bulge outwardly beyond the margins of the metal face-plates 41a, and consequently are less subject to wear.

Other modification may be resorted to without departing from the spirit of the invention or the scope thereof as defined by the appended claims.

What is claimed is:

1. In a resilient wheel for rail vehicles, the combination of a hub structure comprising a radially outwardly extending flange, a tire structure concentric with said hub structure and comprising a radially inwardly extending flange disposed laterally of said hub flange in spaced relation thereto, and resilient elements disposed within the space between the adjacent lateral faces of the hub flange and tire flange and constituting the sole means connecting said structures to each other, said space being open to the exterior of the wheel at radially spaced apart points whereby a circulation of air within said space is effected when the wheel rotates.

2. In a resilient wheel for rail vehicles, the combination of a hub structure comprising a radially outwardly extending flange, a tire structure concentric with said hub structure and comprising a radially inwardly extending flange disposed on one side of the latter in laterally and radially spaced relation thereto, an annular member connected at its outer periphery to said tire structure and disposed on the other side of said hub flange in laterally and radially spaced relation thereto, and resilient elements disposed in the spaces between the respective lateral faces of the hub flange and the adjacent faces of the tire flange and attached annular member, there being apertures formed adjacent the outer periphery of the said annular member for the ejection of air that is drawn into the spaces occupied by the resilient elements through the open region of the latter adjacent the wheel hub.

3. A springing element of ring shape comprising a plurality of sector shaped segments of rubber each surface bonded at opposite faces to thin metallic plates, said segments and their plates being spaced circumferentially from other segments and plates thereby providing a plurality of air spaces radially of the element between said segments.

4. A springing element of ring shape comprising a plurality of sector shaped segments of rubber surface bonded at opposite faces to metallic face plates, said segments being spaced circumferentially thereby providing a plurality of air spaces radially of the element.

5. In a resilient wheel, the combination of a hub structure having a radially outwardly extending flange, a tire structure concentric with said hub structure, said tire structure having a radially inwardly extending flange disposed laterally of said hub flange in spaced relation thereto, a cap plate associated with and laterally spaced from the axially outer surface of one of said flanges with the inner of said flanges being sandwiched between said cap plate and the outer of said flanges, a plurality of small resilient elements disposed in spaced apart relation between the adjacent lateral faces of said flanges and between the axially inner surface of said cap plate and the axially outer surface of said inner flange, and a plurality of circumferentially spaced bolts extending between said cap plate and said outer flange for drawing them laterally towards each other to compress said resilient elements between said outer and inner flanges and between said cap plate and said inner flange, the portion of said inner flange adjacent said bolts being apertured whereby said bolts do not engage therewith and said resilient elements form the sole connection between said inner and outer flanges and between said inner flange and said cap plate, said space between said flanges and said cap plate being open to the lateral exterior of the wheel at radially spaced points.

6. In a resilient wheel, the combination of a hub structure having a radially outwardly extending flange, a tire structure concentric with said hub structure, said tire structure having a radially inwardly extending flange disposed laterally of said hub flange in spaced relation thereto, a cap plate associated with and laterally spaced from the axially outer surface of one of said flanges with the inner of said flanges being sandwiched between said cap plate and the outer of said flanges, a plurality of small resilient elements disposed in spaced apart relation between the adjacent lateral faces of said flanges and between the axially inner surface of said cap plate and the axially outer surface of said inner flange, and means extending between and normally engaging with only said cap plate and said outer flange for drawing them laterally towards each other to compress said resilient elements between said outer and inner flanges and between said cap plate and said inner flange, said resilient elements forming the sole connection between said inner and outer flanges and between said inner flange and said cap plate, said space between said flanges and said cap plate being open to the lateral exterior of the wheel at points spaced to facilitate circulation of air therein upon rotation of the wheel.

7. In a resilient wheel for rail vehicles, the combination of a hub structure comprising a radially outwardly extending flange, a tire structure concentric with said hub structure and comprising a radially inwardly extending flange disposed laterally of said hub flange in spaced relation thereto, a cap plate secured to said hub structure in spaced lateral relation with said tire flange and sandwiching it between said hub flange and cap plate, and resilient elements disposed within the space between the adjacent lateral faces of the hub flange and tire flange and the cap plate and tire flange, and connecting said structures to each other, said space being open to the exterior of the wheel at radially spaced apart points whereby a circulation of air within said space is effected when the wheel rotates.

8. In a resilient wheel for rail vehicles, the combination of a hub structure comprising a radially outwardly extending flange, a tire structure concentric with said hub structure and comprising a radially inwardly extending flange disposed laterally of said hub flange in spaced relation thereto, resilient elements disposed within the space between the adjacent lateral faces of the hub flange and tire flange and connecting said structures to each other, said resilient elements having opposed faces, and metal plates secured to the opposed faces of said resilient elements, said metal plates being received in recesses formed in said tire flange and said hub flange to aid in positioning said resilient elements.

9. In a resilient wheel for rail vehicles, the combination of a hub structure comprising a radially outwardly extending flange, a tire structure concentric with said hub structure and comprising a radially inwardly extending flange disposed laterally of said hub flange in spaced relation thereto, resilient elements disposed within the space between the adjacent lateral faces of the hub flange and tire flange and connecting said structures to each other, and means associated with said hub flange and said tire flange for limiting relative arcuate movement therebetween, said space being open to the exterior of the wheel at radially spaced apart points whereby a circulation of air within said space is effected when the wheel rotates.

CURT SAURER.